United States Patent [19]

Kobayashi et al.

[11] Patent Number: 4,710,907

[45] Date of Patent: Dec. 1, 1987

[54] OPERATION PROHIBITION DEVICE FOR AN AUDIO INSTRUMENT

[75] Inventors: Kozo Kobayashi, Kodaira; Hideo Goto, Mitaka, both of Japan

[73] Assignee: Nakamichi Corporation, Kodaira, Japan

[21] Appl. No.: 536,162

[22] Filed: Sep. 26, 1983

[30] Foreign Application Priority Data

Oct. 29, 1982 [JP] Japan ................................. 57-189246

[51] Int. Cl.⁴ ............................................ H04B 1/20
[52] U.S. Cl. ....................................... 369/6; 455/344
[58] Field of Search ................... 869/6, 7; 360/15, 60; 358/114; 455/151, 181, 186, 344, 349; 340/825.21, 825.31, 825.34; 179/90 BD, 18 B

[56] References Cited

U.S. PATENT DOCUMENTS

| | | | |
|---|---|---|---|
| 3,612,777 | 10/1971 | Ban | 369/6 |
| 4,277,651 | 7/1981 | Fisher, II et al. | 179/90 BD X |
| 4,332,982 | 6/1982 | Thomas | 179/18 B X |
| 4,392,218 | 7/1983 | Plunkett, Jr. | 369/29 |
| 4,464,678 | 8/1984 | Schiff et al. | 340/825.34 X |
| 4,481,512 | 11/1984 | Tscheulin et al. | 455/349 X |
| 4,510,623 | 4/1985 | Bonneau et al. | 455/151 X |

OTHER PUBLICATIONS

Nakamichi Mobile Sound System—7D-1200/PA-300/SP-400—Brochure in Examiners Library.
GMBH Article—Tech. Recitt., vol. 57, No. 6, 1979, pp. 222-226, copy in 369-6.

Primary Examiner—Aristotelis M. Psitos
Attorney, Agent, or Firm—Pearne, Gordon, McCoy & Granger

[57] ABSTRACT

This invention relates to an operation prohibition device for an audio instrument such as a tape recorder. The operation prohibition device prohibits the audio instrument from being operated by operating switches when predetermined prohibition conditions are met and releases the prohibition state of the audio instrument in response to input of a correct predetermined coded number.

4 Claims, 2 Drawing Figures

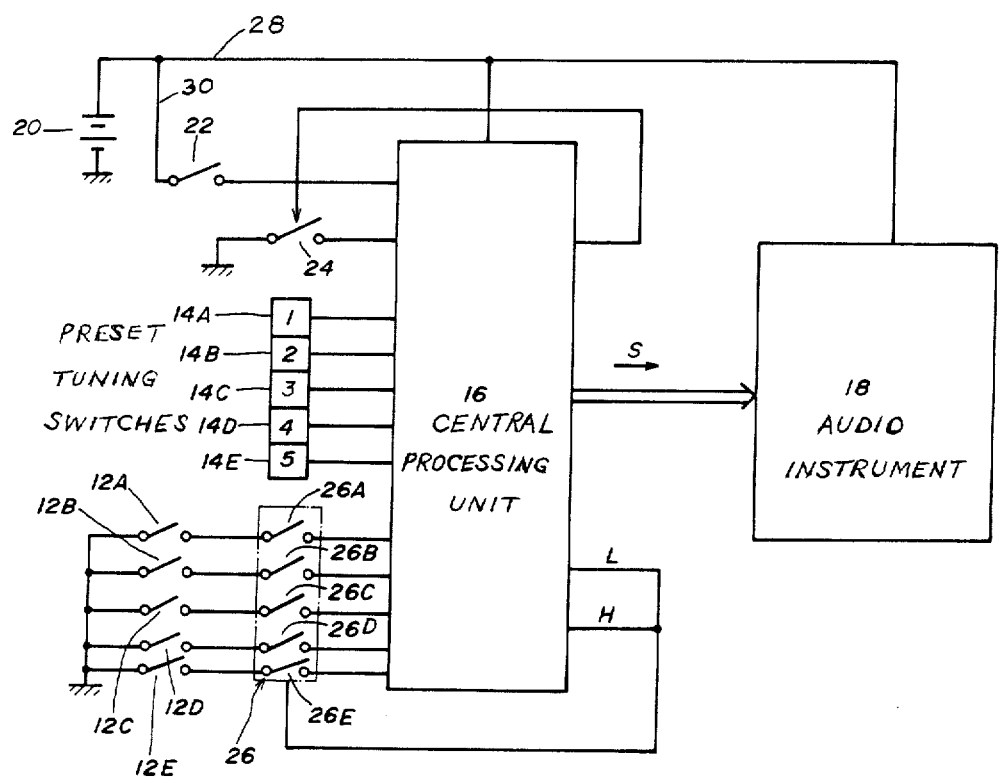

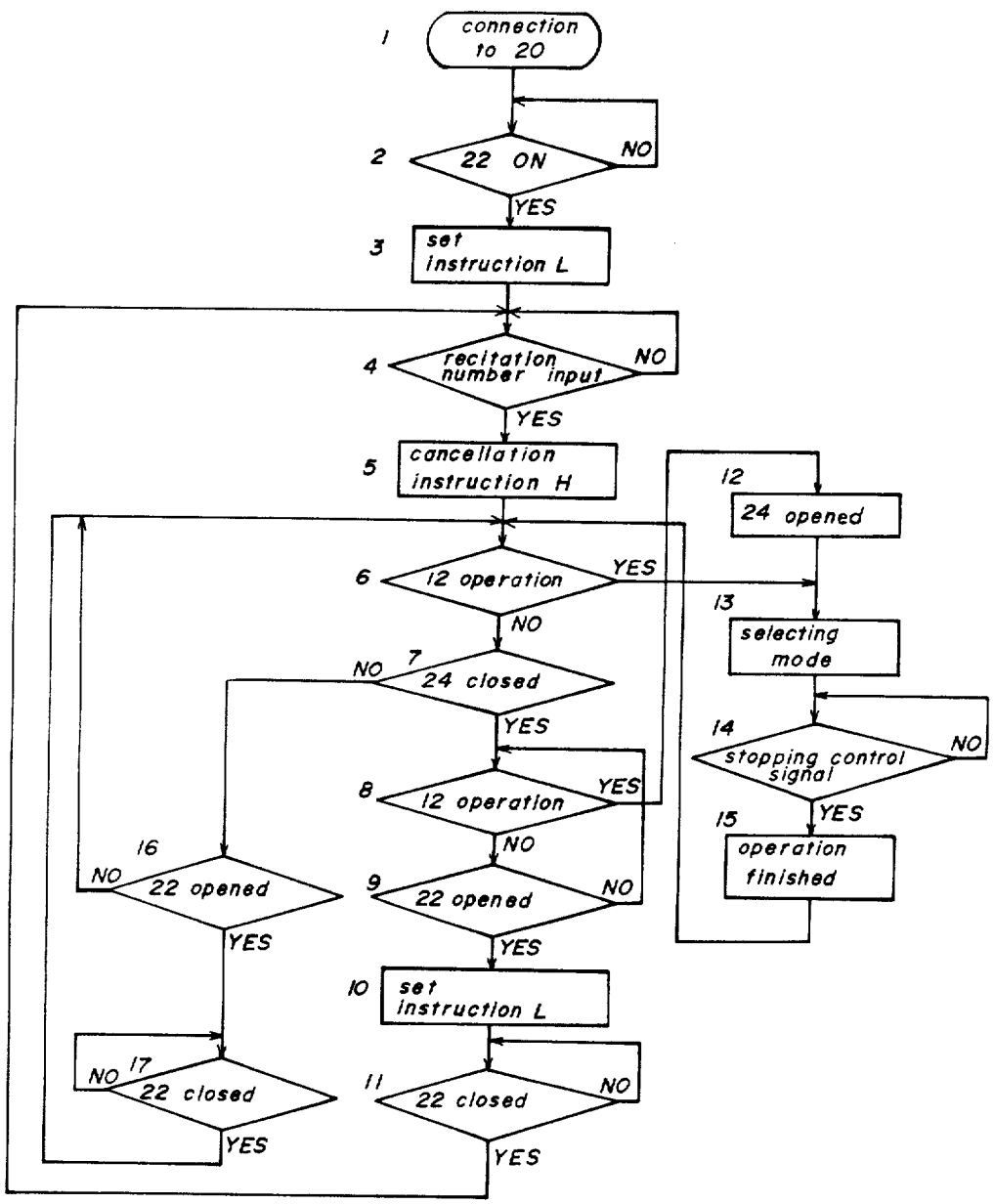

OPERATION PROHIBITION DEVICE FOR AN AUDIO INSTRUMENT

BACKGROUND OF THE INVENTION

Of late, an audio instrument such as a cassette type tape recorder tends to have a high quality and therefore, it has a high cost. If such an expensive audio instrument provides an operation prohibition device so that the audio instrument cannot be used by another person except specific persons, it will avoid being damaged by mischief and from robbery. However, since conventional audio instruments are free to be used by another person, they cannot avoid being damaged by mischief and from being stolen.

SUMMARY OF THE INVENTION

Accordingly, it is a principal object of the invention to provide an operation prohibition device for an audio instrument wherein specific persons who know a recitation code number can initiate the operation of the instrument.

It is another object of the invention to provide an operation prohibition device for an audio instrument wherein the construction is simplified.

In accordance with the present invention, there is provided an operation prohibition device for an audio instrument which is able to be operated by operating switches on condition that said audio instrument is connected to a power source and that a power switch is closed, said operation prohibition device comprising;

means to monitor predetermined operation steps of said audio instrument and to forcibly prohibit an operation of said audio instrument by said operating switches when said predetermined operation steps are performed;

manually operable means to generate a recitation code number as a cancellation signal; and means to release said forcible prohibition when a correct recitation code number has been generated as a cancellation signal.

BRIEF DESCRIPTION OF THE DRAWINGS

The above and other objects and features of the invention will be apparent from the description of the embodiment taken along with reference to the drawings in which;

FIG. 1 is a schematic diagram of an embodiment of an operation prohibition device for an audio instrument in accordance with the invention;

and FIG. 2 illustrates a program for a central processing unit for an operation of the device of the invention.

DETAILED DESCRIPTION OF THE EMBODIMENT

Referring now to an embodiment of the invention, FIG. 1 shows an embodiment of the invention in which an operation prohibition device is applied to a cassette type tape recorder with a radio for a car. Operating switches 12A through 12D are ones for selecting each operation mode of the tape recorder such as playback, stop, fast forward or rewind and one for selecting an operation mode of the radio, respectively. The radio has preset tuning switches 14A through 14E. A central processing unit 16 which is a microcomputer provides a mode control signal s in response to operations of the operating switches 12A through 12D to an operation section 18 which includes a tape recorder operation section and a radio operation section so that the operation section 18 goes into the selected operation mode. A DC power source 20 which is a car battery is directly connected to the central processing unit 16 and the operation section 18 while it is connected to the central processing unit 16 through an ignition switch 22.

The central processing unit 16 includes means to monitor predetermined prohibition conditions and to generate a prohibition instruction L when the prohibition conditions are met and means to generate a prohibition cancellation instruction H in response to input of a correct recitation code number by cancellation signal generating means described later. In the illustrated embodiment, the preset tuning switches 14A through 14E serve as the cancellation signal generating means. Each of the tuning switches 14A through 14E is operated to generate a signal indicating number "1", "2", "3", "4" or "5", respectively. It should be noted that the recitation code number is the number of five figures preselected from among numbers "1,1,1,1,1" to "5,5,5,5,5", which can be obtained by the operation of the switches 14A through 14E.

The device of the illustrated embodiment further comprises switch means 26 to prohibit the operation responding to the operation of the operating switches and to cancel the prohibition in response to the prohibition instruction L and the prohibition cancellation instruction H, respectively. The switch means 26 comprises prohibition switches 26A through 26E provided between the central processing unit 16 and the operating switches 12A through 12E, respectively. The prohibition switches 26A through 26E are adapted to be opened by the prohibition instruction L and closed by the prohibition cancellation instruction H. A prohibition preparing switch 24 is used in case that the user desires to obtain the prohibition state other than in case an emergency such as robbery occurs.

In operation, FIG. 2 shows a program set in the central processing unit 16. When the cassette type tape recorder with a radio for a car (audio instrument) is initially installed in a car, the audio instrument is firstly connected to the power by line 28. After this connection, the ignition switch 22 is closed for enabling audio instrument to be operated so that the tape recorder or the car radio is played. These successive steps by the user meet the prohibition conditions so that the prohibition instruction L is generated by the central processing unit 16. Thus, it will be understood that the audio instrument can never be operated even though the operating switches 12A through 12E are pushed since the prohibition switches 26A through 26E are opened. In case the user knows the correct recitation code number for releasing the prohibition state and operates the tuning switches 14A through 14E to generate the correct code number, the central processing unit 16 generates the prohibition cancellation instruction H to close the prohibition switches 26A through 26E. Thus, it will be noted that the operation of the audio instrument can be established by closing any of the operating switches 12A through 12E. The above successive steps are shown at blocks 1 through 6 and 13 in FIG. 2. When the selected operation mode of the audio instrument is finished, as shown at blocks 14 and 15 in FIG. 2, any of the operating switches 12A through 12E may be closed so as to continue the next operation mode, if desired.

After finishing the desired operations of the audio instrument, if the prohibition preparing switch 24 is closed without pushing the operating switches 12A through 12E and then the ignition switch 22 is opened, these subsequent steps by the user meet the prohibition conditions to generate the prohibition instruction L. This causes the prohibition switches 26A through 26E to be opened so that the prohibition state is held (see blocks 6 through 10 in FIG. 2). Thus, it will be understood that even though the ignition switch 22 is closed, the audio instrument can never be operated unless the recitation code number is generated (see blocks 11 and 4 in FIG. 2 ). It should be noted that even though the prohibition preparing switch 24 has been closed in the above case, the audio instrument can be operated by the operating switches 12A through 12E unless the ignition switch 22 is opened (see blocks 6,7,8 and 12 in FIG. 2).

On the other hand, after finishing the operation of the audio instrument, if the ignition switch 22 is opened without operating either the operating switches 12A through 12E or the prohibition preparing switch 24, then the prohibition conditions for the user are never met. Thus, the central processing unit 16 never generates the prohibition instruction L. Therefore, if the ignition switch 22 is again closed, the audio instrument can be immediately operated merely by closing the operating switches 12A through 12E without input of the recitation code number (see blocks 6,7,16,17 and 6 in FIG. 2).

While one preferred embodiment of the invention has been described and illustrated with reference to the accompanying drawings, it will be understood by those skilled in the art that it is by way of example, and that various changes and modifications may be made without departing from the spirit and scope of the invention. For example, the prohibition switches 26A through 26E may be disposed at various positions such as between the central processing unit 16 and the operation section 18,for example. Furthermore, the prohibition switches 26A through 26E may be omitted by having such a program that the control signal s itself is never generated to provide the prohibition state of the audio instrument instead of using the prohibition instruction and the prohibition cancellation instruction.

What is claimed is:

1. An operation prohibition device for an audio instrument which is able to be operated by operating switches on condition that said audio instrument is connected to a power source and that a power switch is closed, said operation prohibition device comprising;
   a first power source line connecting said power source to said audio instrument not through said power switch;
   a second power source line connecting said power source to said audio instrument through said power switch;
   means to monitor predetermined operation steps of said audio instrument and to forcibly prohibit an operation of said audio instrument by said operating switches when
   two successive steps of connecting said audio instrument to said power source which is detected by monitoring said first power source line and of the closing of said power switch which is detected by monitoring said second power source line are performed;
   manually operable means to generate a recitation code number as a cancellation signal;
   means to release said forcible prohibition means when a correct recitation code number has been generated as a cancellation signal, wherein
   said audio instrument is prohibited from its operation when said audio instrument is disconnected from said power source through said first and second power source lines and then reconnected to said power source through said first power source line and then through said second power source line by closing said power switch, and wherein said audio instrument is not prohibited from its operation when said audio instrument is connected to said power source through said second power source line by closing said power switch upon the condition that said audio instrument remains connected to said power source only through said first power source line by opening said power switch.

2. An operation prohibition device for an audio instrument as set forth in claim 1, wherein said monitoring and forcibly prohibiting and releasing means are performed by a program in a central processing unit.

3. An operation prohibition device as set forth in claim 1, wherein said audio instrument is a cassette type tape recorder with a radio and said cancellation signal generating means comprises preset tuning switches of said radio.

4. An operation prohibition device for an audio instrument which is able to be operated by operating switches on condition that said audio instrument is connected to a power source and that a power switch is closed, said operation prohibition device comprising:
   a first power source line connecting said power source to said audio instrument not through said power switch;
   a second power source line connecting said power source to said audio instrument through said power switch;
   a manually operable prohibition preparing switch;
   means to monitor predetermined operation steps of said audio instrument and connected to said first power source line to forcibly prohibit an operation of said audio instrument by said operating switches in spite of the closing of said power switch when two successive steps of closing said prohibition preparing switch and of opening said power switch, which is detected by monitoring said second power source line, are performed;
   manually operable means to generate a recitation code number as a cancellation signal; and
   means to release said forcible prohibition means when a correct recitation code number has been generated as a cancellation signal;
   wherein said audio instrument is prohibited from its operation when said power switch is closed upon the condition that said prohibition preparing switch has been closed and then said power switch is opened; and wherein said audio instrument is not prohibited from its operation when said power switch is closed upon the condition that said power switch is opened without previously closing said prohibition preparing switch.

* * * * *

UNITED STATES PATENT AND TRADEMARK OFFICE
CERTIFICATE OF CORRECTION

PATENT NO. : 4,710,907
DATED : December 1, 1987
INVENTOR(S) : Kozo Kobayashi

It is certified that error appears in the above-identified patent and that said Letters Patent is hereby corrected as shown below:

In the Abstract, line 7, "coded"
   should be --code--

Column 2, line 43, after "power"
   insert --source 20--

Column 3
   --paragraph beginning at line 57 and the paragraph beginning at line 61
   should be all one paragraph--

Signed and Sealed this

Seventh Day of June, 1988

Attest:

DONALD J. QUIGG

Attesting Officer

Commissioner of Patents and Trademarks